US009922015B2

(12) United States Patent
Anders et al.

(10) Patent No.: US 9,922,015 B2
(45) Date of Patent: Mar. 20, 2018

(54) SYSTEM FOR HANDLING ABBREVIATION RELATED TEXT USING PROFILES OF THE SENDER AND THE RECIPIENT

(71) Applicant: International Business Machines Corporation, Armonk, NY (US)

(72) Inventors: Kelley L. Anders, East New Market, MD (US); Trudy L. Hewitt, Cary, NC (US); Kimberly D. McCall, Leander, TX (US)

(73) Assignee: International Business Machines Corporation, Armonk, NY (US)

(*) Notice: Subject to any disclaimer, the term of this patent is extended or adjusted under 35 U.S.C. 154(b) by 343 days.

(21) Appl. No.: 14/510,176

(22) Filed: Oct. 9, 2014

(65) Prior Publication Data

US 2016/0103808 A1 Apr. 14, 2016

(51) Int. Cl.
*G06F 17/24* (2006.01)
*G06F 17/27* (2006.01)
*H04L 29/08* (2006.01)
*G06F 17/30* (2006.01)
*G06F 17/22* (2006.01)

(52) U.S. Cl.
CPC .......... *G06F 17/24* (2013.01); *G06F 17/2276* (2013.01); *G06F 17/276* (2013.01); *G06F 17/2795* (2013.01); *G06F 17/30699* (2013.01); *H04L 67/306* (2013.01); *G06F 17/22* (2013.01); *G06F 17/2735* (2013.01)

(58) Field of Classification Search
CPC ............... G06F 17/2735; G06F 17/276; G06F 17/2795; G06F 17/28; G06F 17/2809; G06F 17/2818; G06F 17/2827; G06F 17/2836; G06F 17/2845; G06F 17/289; G06F 17/241

USPC ................. 715/231, 259, 260, 261
See application file for complete search history.

(56) References Cited

U.S. PATENT DOCUMENTS 5,623,406 A * 4/1997 Ichbiah ................. G06F 3/0489 704/3
5,634,084 A * 5/1997 Malsheen ............. G06F 17/273 704/260

(Continued)

FOREIGN PATENT DOCUMENTS

WO 2008025645 A2 3/2008

OTHER PUBLICATIONS

Abbrex, "Abbrex—Abbreviation Expander Add-on," The Abbreviation Expander, © 2011-2012 abbrex.com.

(Continued)

*Primary Examiner* — Mohammed-Ibrahim Zuberi
*Assistant Examiner* — Yahao Chen
(74) *Attorney, Agent, or Firm* — Laura E. Gisler (57) ABSTRACT

Abbreviations can be handled by a computer system that receives a message that specifies a recipient and a sender. A first text portion is identified from the message as being associated with an abbreviation. A sender and receiver profile are used to identify a set of one or more solutions for the first text portion. The solutions are scored based upon the online content exposure information in the profile of the recipient. Based upon the scoring, a particular solution of the one or more solutions is identified for use. The text body of the message is modified to include the particular solution, and the modified message is transmitted to the recipient.

15 Claims, 7 Drawing Sheets

(56) References Cited

U.S. PATENT DOCUMENTS

| | | | |
|---|---|---|---|
| 6,611,825 B1* | 8/2003 | Billheimer | G06F 17/30616 382/156 |
| 6,934,767 B1* | 8/2005 | Jellinek | G06Q 10/10 235/375 |
| 7,028,038 B1* | 4/2006 | Pakhomov | G06F 17/277 704/275 |
| 7,136,876 B1* | 11/2006 | Adar | G06F 17/2735 |
| 7,315,902 B2 | 1/2008 | Kirkland | |
| 7,366,500 B1* | 4/2008 | Yalovsky | G06F 17/2735 455/414.1 |
| 7,503,001 B1 | 3/2009 | Lekutai | |
| 7,640,233 B2 | 12/2009 | Baartman et al. | |
| 7,650,348 B2 | 1/2010 | Lowles et al. | |
| 7,890,860 B1* | 2/2011 | Thrasher | G06F 17/24 707/E17.094 |
| 8,037,086 B1 | 10/2011 | Upstill et al. | |
| 8,060,565 B1* | 11/2011 | Swartz | G10L 13/00 704/4 |
| 8,204,874 B2 | 6/2012 | Wei et al. | |
| 8,386,926 B1 | 2/2013 | Matsuoka | |
| 8,498,999 B1 | 7/2013 | Bhalotia | |
| 8,868,590 B1* | 10/2014 | Donneau-Golencer | G06F 17/3053 707/733 |
| 8,903,719 B1 | 12/2014 | Landry et al. | |
| 2002/0152064 A1* | 10/2002 | Dutta | G06F 17/241 704/9 |
| 2003/0018670 A1* | 1/2003 | Ashford | G06F 17/278 715/236 |
| 2004/0122979 A1* | 6/2004 | Kirkland | G06F 17/2205 709/247 |
| 2004/0139400 A1* | 7/2004 | Allam | G06F 17/212 715/201 |
| 2004/0187084 A1* | 9/2004 | Berstis | G06F 17/241 715/259 |
| 2005/0091198 A1* | 4/2005 | Dettinger | G06F 17/30398 |
| 2005/0188322 A1* | 8/2005 | Napoleon | G06F 3/0481 715/760 |
| 2005/0240391 A1 | 10/2005 | Lekutai | |
| 2005/0246365 A1 | 11/2005 | Lowles et al. | |
| 2006/0167992 A1* | 7/2006 | Cheung | G06F 17/241 709/204 |
| 2007/0174045 A1 | 7/2007 | Kao et al. | |
| 2007/0220037 A1* | 9/2007 | Srivastava | G06F 17/30864 |
| 2007/0271089 A1* | 11/2007 | Bates | G06F 17/2247 704/9 |
| 2007/0299925 A1* | 12/2007 | Kirkland | G06F 17/2205 709/206 |
| 2008/0033714 A1* | 2/2008 | Gupta | G06F 17/277 704/9 |
| 2008/0059152 A1 | 3/2008 | Fridman et al. | |
| 2008/0059421 A1 | 3/2008 | Baartman et al. | |
| 2008/0077395 A1* | 3/2008 | Lancaster | G06F 17/2827 704/9 |
| 2008/0077870 A1* | 3/2008 | Napoleon | G06F 3/0481 715/762 |
| 2008/0086297 A1* | 4/2008 | Li | G06F 17/28 704/3 |
| 2008/0313534 A1* | 12/2008 | Cheung | G06F 17/241 715/254 |
| 2009/0150763 A1* | 6/2009 | Griffith | G06F 17/241 715/230 |
| 2009/0259629 A1* | 10/2009 | Wei | G06F 17/30672 |
| 2010/0161733 A1* | 6/2010 | Bower | |
| 2010/0257182 A1* | 10/2010 | Saliba | G06F 17/274 707/747 |
| 2011/0107206 A1 | 5/2011 | Walsh et al. | |
| 2011/0173001 A1* | 7/2011 | Guy, III | G06F 17/2276 704/246 |
| 2012/0054645 A1* | 3/2012 | Hoomani | G06F 17/2836 715/758 |
| 2012/0054646 A1 | 3/2012 | Hoomani et al. | |
| 2012/0084076 A1* | 4/2012 | Boguraev | G06F 17/2735 704/9 |
| 2012/0185478 A1* | 7/2012 | Topham | G06F 17/30616 707/737 |
| 2012/0240025 A1* | 9/2012 | Migos | G06F 3/0488 715/230 |
| 2012/0257731 A1* | 10/2012 | Cast | H04L 51/066 379/88.14 |
| 2012/0262461 A1* | 10/2012 | Fisher | G06F 17/276 345/467 |
| 2012/0330648 A1* | 12/2012 | Boguraev | G06F 17/2735 704/9 |
| 2013/0110500 A1* | 5/2013 | Feng | G06F 17/2282 704/9 |
| 2013/0191739 A1 | 7/2013 | Bank et al. | |
| 2014/0082104 A1 | 3/2014 | Mann | |
| 2014/0136567 A1* | 5/2014 | Bhalotia | G06F 17/3064 707/771 |
| 2014/0229156 A1 | 8/2014 | Leydon et al. | |
| 2014/0289604 A1* | 9/2014 | Cheung | G06F 17/241 715/231 |
| 2014/0303959 A1 | 10/2014 | Orsini et al. | |
| 2014/0303961 A1 | 10/2014 | Leydon et al. | |
| 2015/0081276 A1 | 3/2015 | Gerard et al. | |
| 2015/0113073 A1 | 4/2015 | Chan et al. | |
| 2015/0135063 A1* | 5/2015 | Doornenbal | G06F 17/241 715/254 |
| 2015/0303941 A1* | 10/2015 | Hayes | G06F 17/2264 704/201 |
| 2015/0331853 A1 | 11/2015 | Palmonari et al. | |
| 2016/0041990 A1* | 2/2016 | Dabah | G06F 17/3061 707/722 |
| 2016/0070792 A1* | 3/2016 | Yuan | G06F 17/30864 707/770 |

OTHER PUBLICATIONS

Unknown, "Acronym Expander," AutoHotkey Community, Forums, http://www.autohotkey.com/board/topic/54982-acronym-expander/.

Mell et al., "The NIST Definition of Cloud Computing," National Institute of Standards and Technology, U.S Department of Commerce, Special Publication 800-145, Sep. 2011.

"Accelerated Examination Support Document", International Business Machines Corporation, dated Nov. 23, 2015, 8 pages.

Anders et al., "A System for Handling Abbreviation Related Text", U.S. Appl. No. 14/974,054, filed Dec. 18, 2015.

List of IBM Patents or Patent Applications Treated as Related, dated Dec. 16, 2015, pp. 1-2.

* cited by examiner

SYSTEM FOR HANDLING ABBREVIATION RELATED TEXT USING PROFILES OF THE SENDER AND THE RECIPIENT

BACKGROUND

The present disclosure relates to a computer method, system, and computer program product for handling abbreviation text, based on machine learning and more specifically, to modifying abbreviations according to internet usage analytics.

Computer processing circuits carry out a variety of instructions of a computer program by performing basic functions contained within the stored instructions of the program. These instructions can be modified to carry out a number of different functions and processes. These functions and processes can be carried out over a network, which allows for greater connectivity between personal computers, smart phones, laptops, and other devices.

SUMMARY

Embodiments of the present disclosure are directed toward a computer implemented method for providing solutions relating to abbreviations. A computer system can receive a message that specifies a recipient and a sender and that also includes a text body. The computer system can then identify, from within the text body, a first text portion associated with an abbreviation; retrieve a profile of the sender and a profile of the recipient; identify, based on the sender's profile, one or more solutions for the first text portion associated with an abbreviation; score, based upon the online content exposure information in the profile of the recipient, the one or more solutions for the text portion. The computer system can identify, based upon the scoring, a particular solution of the one or more solutions for use; modify the text body of the message to include the particular solution, and transmit the message, as modified, to the recipient.

Certain embodiments are directed toward a system for handling abbreviations. One or more computer processor circuits can include a monitoring engine configured to: receive a message that specifies a recipient and a sender and that also includes a text body; and identify, from within the text body, a first text portion associated with an abbreviation. The one or more computer processor circuits can also include a processing engine configured to: retrieve a profile of the sender and of the recipient; identify, based on the sender's profile, one or more solutions for the first text portion associated with an abbreviation, and score, based upon online content exposure information in the profile of the recipient, the one or more solutions for the text portion. The processing engine can also be configured to identify, based on the scoring, a particular solution of the one or more solutions for use; modify the text body of the message to include a particular solution, and transmit the message, as modified, to the recipient.

Certain embodiments are directed toward a computer program product for handling abbreviations. The computer program product may be comprised of a computer readable storage medium having program instructions embodied therewith, wherein the computer readable storage medium is not a transitory signal per se, the program instructions executable by a computer processing circuit to cause the circuit to perform a method comprising: receiving a message that specifies a recipient and a sender and that includes text body; identifying, from within the text body, a first text portion associated with an abbreviation; retrieving a profile of the sender and of the recipient; identifying, based on the sender's profile, one or more solutions for the first text portion associated with an abbreviation; scoring, based upon the online content exposure information in the profile of the recipient, the one or more solutions for the text portion; identifying, based upon the scoring, a particular solution of the one or more solutions for use; modifying the text body of the message to include the particular solution; and transmitting message, as modified, to the recipient.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the modification of text communications, more particular aspects relate to modifying text communications relative to abbreviations. While the present disclosure is not necessarily limited to such applications, various aspects of the disclosure may be appreciated through a discussion of various examples using this context.

Various embodiments are directed toward a computer system that can actively monitor messages to provide intelligent and dynamic modifications to the message relative to abbreviations, such as initialisms and acronyms, that relate to the message. As discussed in detail herein, the modifications can be made based upon the inferred knowledge, need, and/or desires of the recipient/sender of the messages.

According to embodiments, the computer system can be configured to receive and analyze abbreviation(s) within a message from a sender so that an abbreviation can be viewed in a modified form by an intended recipient. The system can be configured to identify, from within the content of the message, an abbreviation or a group of words often associated with an abbreviation (or a "potential abbreviation"). In the case of an abbreviation contained within the message, the system can be configured to determine the likely expansion(s) of the abbreviation as intended by the sender. According to embodiments, this process can be accomplished through the use of profiles created for a particular sender and/or a particular recipient. According to embodiments, the profile information can contain information about the sender's interests, knowledge, and past use of terms and abbreviations. For example, the profile information can contain online content exposure information that is generated from a history of the sender's online activities (e.g., forum posts, emails, web-browsing, and hosted websites). If the online content exposure information contained within the profile indicates the sender is very involved with international affairs content, but rather unfamiliar with the art world, the system might select abbreviation expansions related to international affairs, while not selecting those expansions pertaining to the arts. These identified abbreviation expansions can then be scored to reflect the likelihood that a particular solution is the abbreviation the sender intended. The scoring can be based on the profiles created about the sender and receiver. The text can then be modified to reflect the most likely expansion, based on the scores given to each abbreviation expansion. If the receiver's profile indicates the particular receiver is likely to be familiar with the highest scored abbreviation expansion, the system will not modify the text portion associated with the abbreviation. The system can then transmit the message. The system provides for an interface that allows the receiver to specify a modification to the expansion if the incorrect acronym expansion is provided, or if the sender would prefer that the acronym not be expanded. The system can monitor the change and factor it into future abbreviation scoring.

In some embodiments, the system can be configured to identify an abbreviation for the text portion, and collapse the text into an abbreviation, if the system determines the receiver likely knows the sender's intended meaning for the abbreviation. In certain embodiments, this is carried out when the system accesses the sender's profile to locate an abbreviation for the portion of text often associated with an abbreviation, based on the context used by the sender. The system can be configured to score the likelihood that the abbreviation is correct and known by the receiver. This can be completed by accessing the information contained within the sender and receiver's profiles. The text can then be condensed into an abbreviation and sent, along with the original message, to the receiver. In certain embodiments, the system can embed a selectable option that allows the receiver to expand the acronym if desired. For instance, the system may wrongly infer familiarity with an acronym due to factors such as misleading receiver profile data or an incorrect expansion due to inaccurately inferring the sender's intent. The system can monitor these changes and factor them into future abbreviation scoring.

Figure 1:
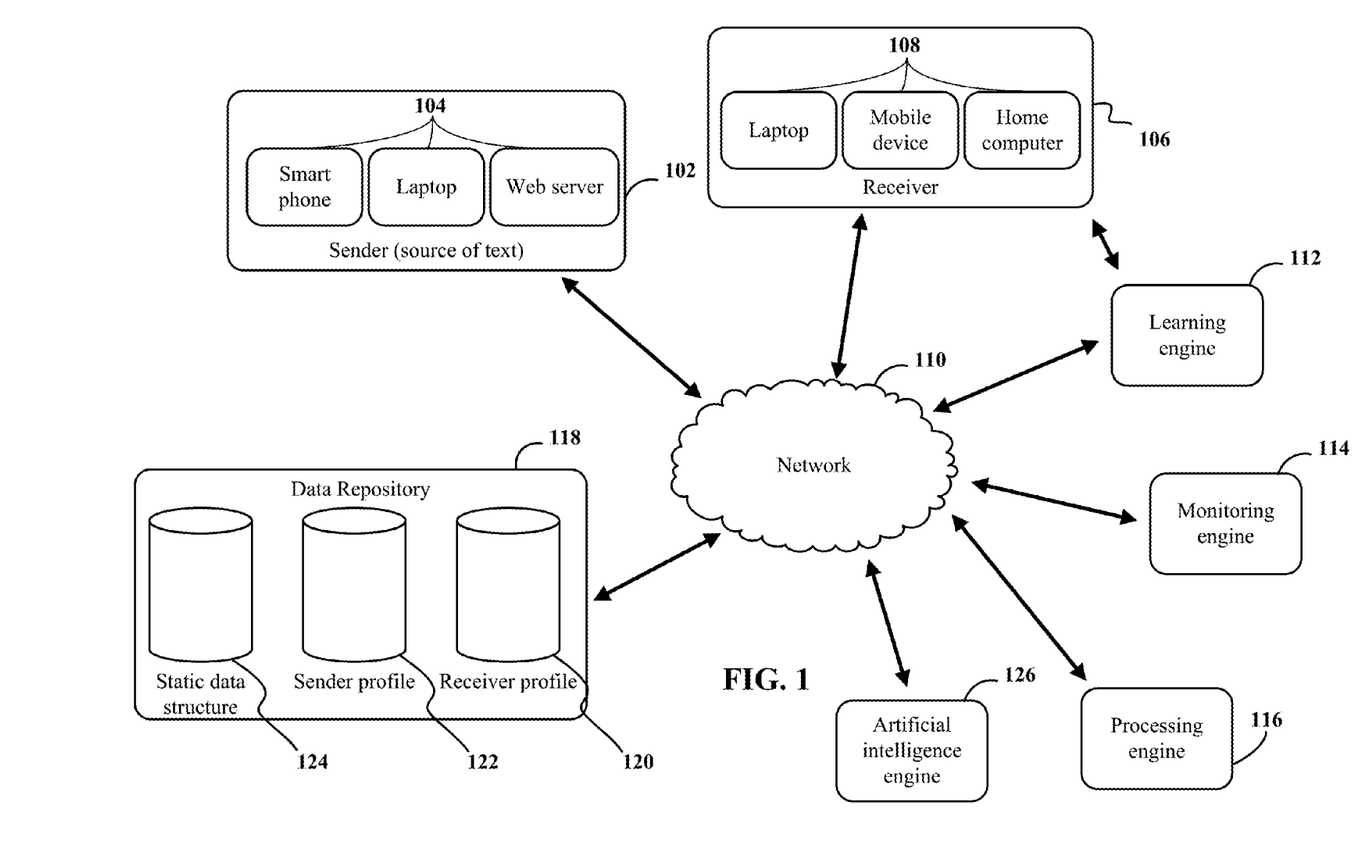
FIG. 1 depicts a system for modifying a text portion associated with an abbreviation based upon a profile that contains use data and abbreviation information, consistent with embodiments of the present disclosure.

Turning now to the figures, FIG. 1 depicts a system for modifying a text portion associated with an abbreviation based upon a profile that contains use data and abbreviation information, consistent with embodiments of the present disclosure. FIG. 1 is carried out on various computer processing circuits, and includes at least the engines described herein. A sender 102 of a message containing a text body may be a smart phone, laptop, an email web server, or other processing hardware devices. A few examples of a sender are depicted by the images 104. In some embodiments, a sender sending a message intended for a recipient initiates the system (e.g., sending an email); however it is also possible that the message can be initiated by a recipient (e.g., accessing a website), or automatically initiated.

As used herein, the term sender may refer to either of (or both) a sender user and a sender device. For example, a sender user may be a person, business or entity associated with a particular identity. A sender device may be a smart phone, laptop computer, home personal computer, or a web server, or others. The system can identify the relevant sender profile based upon either (or both) of the sender device and the sender user. For ease of discussion and unless otherwise stated, the term sender is used herein to describe either of (or both) the sender user and the sender device.

For example, an email can be sent from a businesswoman's email account, on her smart phone during a commute. Here, the woman herself may be the sender user. The email account from which the email originated may also be considered the sender user. The sender device could be the smart phone from which the message was sent. The email web server which sent the email could also be considered the sender device. As mentioned above, either of (or both) the sender user and the sender device is understood to be the sender herein.

Similarly, the term recipient may refer to either a recipient user or a recipient device. A recipient user may be a person, business, or entity associated with a particular identity. A recipient device may be a smart phone, laptop computer, home personal computer, or a web server, or others. The system can identify the relevant recipient profile based upon either (or both) of the recipient device and the recipient user. For ease of discussion and unless otherwise stated, the term recipient is used herein to describe either of (or both) the recipient user and the recipient device.

For example, an email can specify a particular destination email account. A man may access his email account on his laptop at a coffee shop. The man himself can be considered the recipient user. The account and/or the person, business, or entity associated with the account can be considered the recipient user. His laptop could be considered the recipient device. The email's web server could also be considered the recipient device. For an additional example, a TWEET may be transmitted to a server that hosts a particular TWITTER follower's account. The follower (the person, business, entity or other associated with the account) can be identified relative to the account and considered the recipient user. The recipient device that receives the TWEET can include the TWITTER web server, a smart phone, laptop, or other similar device. The system can be configured to identify the relevant recipient profile based upon either (or both) the recipient user and the recipient device.

In certain embodiments, the message can be sent and received over one or more networks 110. The networks can include, but are not limited to, local area networks, point-to-point communications, wide area networks, the global Internet, and combinations thereof.

In certain embodiments, the sending of the message initiates the system. Once initiation occurs, a monitoring engine 114 identifies a text portion associated with an abbreviation (or "text piece") within the text body of the message. A processing engine 116 can evaluate the identified text piece to determine the appropriate solution based on information contained within the data repository 118. For instance, the solution can reflect the correct expansion of the abbreviation based on the inferred context of the sender's message as well as the recipient's likely knowledge of the abbreviation, as determined by a scoring process discussed herein.

The information contained within the data repository 118 can include profiles for both the sender, per 122, and recipient, per 120, as well as other data sources, per column 124, and more. By way of example only, the data structure, per 124, may contain data corpora of abbreviation expansions and local dictionaries as well as system rules and criteria. The profiles of both the sender, per 122 and the recipient, per 120, can contain online content exposure information. For instance, the profiles can be created through the compilation of information from actual past use of abbreviations on sites, browsing history, social media engagement, and the interests and network of the user's social media connections. The sources of the profile information are not intended to be limiting but rather are included as examples.

Consistent with embodiments, a best solution or set of solutions is generated and scored through the scoring of information contained within the data repository. For example, if a text piece associated with an abbreviation is a collapsed version of an abbreviation (e.g. N.A.T.O.), then a solution could be the expanded form of the abbreviation (e.g. North Atlantic Treaty Organization). The solution could appear the same as the abbreviation (e.g. N.A.T.O.), and have a score reflecting the confidence the sender is familiar with the abbreviation attached. Similarly, if a text piece associated with an abbreviation is a potential abbreviation (e.g. Oxford English Dictionary), then a solution could be a collapsed form of the abbreviation (O.E.D.). The solution could also appear as the original text portion (e.g. Oxford English Dictionary), if scoring described below indicates an unfamiliarity with the abbreviation on the recipient's part. In each case, a confidence value, which is detailed below, may be included with the solution.

Briefly, a processing engine 116 can score the suggested modification based on the sender's profile for the purpose of determining the most likely correct solution(s) in the context of the sender's message. A processing engine 116 could also score each generated solution to reflect the recipient's familiarity with and knowledge of each particular solution.

Consistent with embodiments, an artificial intelligence engine 126 can calculate a confidence value for each of the solutions. For example, the engine can combine the two scores generated by a processing engine 116, and other information, to provide an overall confidence value as a percentage that a provided solution, meaning both the word choice and the collapsed or expanded option, is correct. The recipient user can then use her best judgment to evaluate the provided solution(s). This description is in no way intended to limit the manner in which a confidence determination is made, but rather it is purposed to provide examples of how a confidence value of the generated solution can be made.

The message can then be modified to reflect the highest-scored solution and transmitted to the receiver 106. In some embodiments, the calculated confidence value can be transmitted along with the highest-scored solution(s). The receiver 106 can be one of a number of technologies, including but not limited to a laptop, a mobile device, or a home computer, as per 108.

In certain embodiments, a learning engine 112 monitors changes to the transmitted abbreviation solution from the receiver 106. These changes and user viewership are then factored into future determinations by the system. For example, in certain embodiments, a sender 102, such as a TWITTER website server 104, may send a TWEET (a message containing a text body), which contains an abbreviation, "LOL." The message or the "TWEET" may be sent and received over one or more networks, 110. In some embodiments, the sending of the TWEET initiates the system. Once initiated, a monitoring engine 114 identifies a text portion associated with an abbreviation within the TWEET, identifying the sole abbreviation "LOL" in the example. Then, in some embodiments, a processing engine 116 evaluates the text piece (in this case the abbreviation "LOL") to determine the appropriate solution for the abbreviation, based on the information contained within the data repository 118. The system can access a data structure, which per column 124 can include dictionaries and acronym repositories, to generate a list of appropriate abbreviation solutions. Here, the list may include the acronym expansions "laugh out loud," "lands of lore," and "loss of life". The system can then access the sender's profile 122 which may contain information about the websites the sender visits, the TWEETs sent from the sender's account, the sender's friends, and their various connections, among other information. The information contained within the sender's profile can be used by a processing engine 116 to further evaluate the appropriateness of each of the abbreviation expansions included in the list and generate a score which reflects the likelihood of correctness of each expansion on the list. For example, the sender's profile may indicate the sender frequently visits gaming blogs and discussion forums, is well connected on FACEBOOK and TWITTER, and has recently TWEETed about his video game progress, foreign policy, and his cat. This information can be used by the processing engine to determine that "laugh out loud" and "lands of lore" are likely expansions, while "loss of life," an acronym prevalent nearly exclusively in an insurance context, is an unlikely expansion intended by the sender.

For example, an engine might calculate a mid to high score that "lands of lore" is the correct expansion, based on the sender's past use of the abbreviation in a gaming context and her frequent interaction with the gaming community. However, the first score would be slightly lowered, because "laugh out loud" is a viable alternative, based on the sender's frequent interaction with social media contacts via TWITTER and other media where "laugh out loud" is commonly abbreviated "LOL." Based on these determinations, the text of the TWEET would then be marked for modification relative to the determined solution "lands of lore" replacing the acronym "LOL."

A processing engine 116 may then access a recipient's profile, which establishes that the receiver is an avid online shopper in the fashion industry, has TWEETed almost exclusively on designers during fashion week and has established a heavy social media presence in the fashion industry through his social media connections. The processing engine 116 can score each of the generated expansions based upon this information, with the score purposed to reflect the recipient's familiarity with the abbreviation. In this context, the score might indicate the recipient is familiar with "LOL" abbreviating "laugh out loud," but not "lands of lore."

For example, an engine might calculate the second score, the score the receiver does not know the abbreviation, is high in the case of "lands of lore," due to the expansions relative genre specificity and the receiver's apparent obliviousness to the online gaming community, among potentially other reasons. The second score for LOL, the score which indicates the recipient's unfamiliarity with the expansion "laugh out loud" for LOL, could be relatively lower due to the ubiquity of the abbreviation in social media. Thus, the receiver's second score could reflect a high probability that he knows LOL may abbreviate "laugh out loud," because the abbreviation is heavily used in social media and he, the recipient, uses social media frequently.

In some embodiments, an artificial intelligence engine (AI) 126 could determine, based on the processing engine's scoring and the information contained within the data repository, a confidence value for each solution. For example, an AI engine 126 may calculate a confidence value to reflect as a percentage the accuracy of both the expansion selection (lands of lore) and the modified version (expanded), using the scores from the processing engine, among other information. The two scores, among other information, may be used by the AI engine 126 to generate a final confidence value which could be transmitted with the abbreviation solution(s) to the receiver 106 in the TWEET. The recipient, a mobile device 108 could receive the message and display it in an expanded form, fully spelling out the words "lands of lore."

The recipient user viewing the TWEET could determine if the expansion makes sense in the context of the TWEET. The recipient could also view the confidence value with the solution(s), and use the number to help in the decision. If the incorrect abbreviation solution was provided, the user can correct it via a user interface (UI). A learning engine 112 can monitor the receiver-end change and factor it into future determinations.

For example, the recipient, a mobile device 108, may receive the TWEET containing the expanded text "lands of lore" in place of "LOL" and realize the expansion ought to have been "laugh out loud." He may select from the list of provided expansions in the UI, "laugh out loud" and that expansion will replace "lands of lore" on the screen. The learning engine 112 can factor the particular receiver's change into future determinations. This may include adjusting the parameters of a learning algorithm to reduce the probability of selecting "land of lore" in future determinations.

If "lands of lore" had been the correct abbreviation expansion for "LOL" in the TWEET, a learning engine 112 can note that no change was made to the message and factor the correct transmission as well as the recipient's exposure to the solution "lands of lore" as an expansion of "LOL" into future determinations.

In some embodiments, this process occurs as a personalized analysis based on each individual receiver's profile. For example in this case, the same sender-based scoring by a processing engine 116 could occur, but a different recipient-based determination could occur for each follower of the sender's TWITTER account. Thus, although the sender may be the same, the determined abbreviation solution could change for each recipient, with some recipient's receiving the expanded version and some recipient's receiving the collapsed version of "lands of lore," based on their individual scores.

Figure 2:
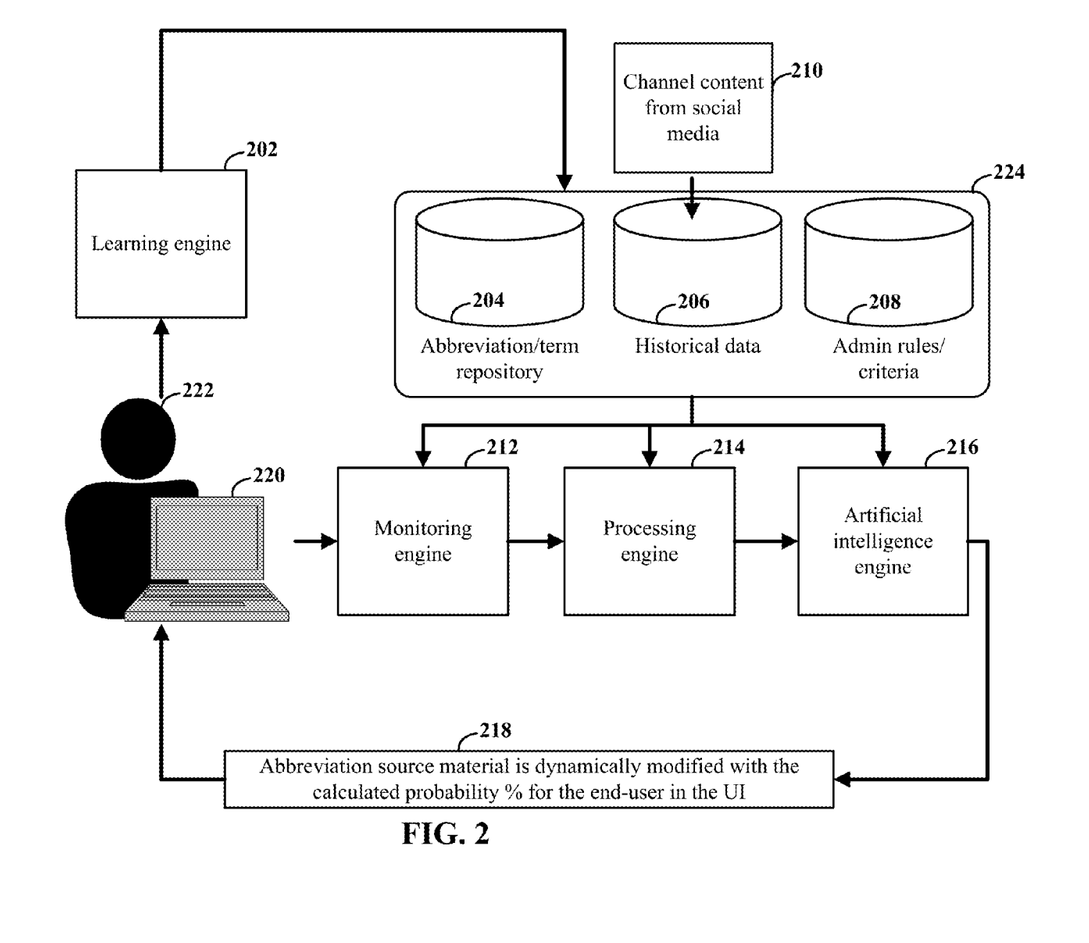
FIG. 2 depicts a flow diagram for determining and transmitting the proper abbreviation solution, according to embodiments of the present disclosure.

FIG. 2 depicts a flow diagram for determining and transmitting the proper abbreviation solution, according to embodiments of the present disclosure. The user depicted in 222 inputs a message via a UI intended for a recipient into the device, an embodiment of which is shown as a laptop in 220. As mentioned, both the user and the device are considered the sender. The message is sent. This transmission initiates the system's monitoring engine, shown by block 212, to identify one or more text pieces associated with an abbreviation within the text body of the message. The systems selects the first instance of the text piece associated with an abbreviation ("text piece") to be the subject of the analysis, and it proceeds. In embodiments, a processing engine can then generate a potential list of abbreviation solutions through accessing information stored in a data repository 224, like an abbreviation and term repository 204. A processing engine 214 may score the selected text portion solutions, assigning one score to reflect the accuracy of solution based on the inferred context of the sender's message, and assigning a second score to indicate the recipient's probable knowledge of the abbreviation, based on the sender and receiver's profiles (respectively). An artificial intelligence engine 216 may then calculate a confidence value which indicates the likelihood the highest-scored solution is correct. An AI engine 216 can calculate this value through factoring in the two scores calculated by a processing engine 214, among other information.

Machine learning paradigms, otherwise known as cognitive data/information processing, pattern classification or pattern recognition and regression methods, artificial or computational intelligence, data mining, statistical data analysis, computational learning, and cognitive machines, etc., are capable of sorting objects into classes in the way a human can. These algorithms extract "features" or attributes from a data source. An aspect of various machine learning procedures are the acquisition of training data, which can include the use of supervised, unsupervised or hybrid learning techniques. For example, the predictive models can include appropriate supervised learning algorithms, such as regression models, artificial neural networks, support vector machines, and statistical classifiers, trained on data from the knowledge base, which can include objects presented to the classifier whose classes are known. This enables the classifier to then identify the characteristics, models and clusters according to class (e.g., by finding the cluster which most closely corresponds to the features extracted from the object). As a particular example, the AI engine can be configured to identify features for different individuals based upon their respective exposure history. These features can then be used and applied to particular messages and abbreviations to infer knowledge of the individuals.

As illustrated in the figure, each of the engines—blocks 212, 214 and 216—are able to use information from the different structures which make up the data repository 224. A few of the structures are illustrated in 204, 206, and 208, which contain information about abbreviations, sender and receiver internet use, and system rules and criteria, respectively. Notably, a repository of historical data, per 206, is continually updated with online context exposure information, gleaned from various social media channels, illustrated by block 210. These examples are intended merely to illustrate potential sources of information, but in no way limit the sources.

As mentioned above, a processing engine, as informed by the above information contained in a data repository, block 224, determines the most likely abbreviation solution and the likelihood the receiver knows of the abbreviation. An artificial intelligence engine 216 then determines the probability of the correctness of the chosen solution and the likelihood that the receiver knows the solution. The text of the abbreviation contained within the message is then changed. If another text piece associated with an abbreviation exists within the message, the analysis cycle can begin again, with a monitoring engine 212 identifying the abbreviation, the processing engine 214 determining the solution and an artificial intelligence engine 216 calculating confidence values. Once all text pieces associated with an abbreviation contained within the message have been analyzed and modified accordingly, the message is transmitted to the recipient with the appropriate confidence value(s), per 218.

Any changes on the recipient's end are monitored by a learning engine 202 and that information is factored into the wealth of information contained in the data repository 224 which is used by the 212, 214, and 216 engines in making future determinations. If no change is made on the receiver's end, a learning engine 202 can factor the receiver-end exposure and the lack of modification into future modifications.

Figure 3:
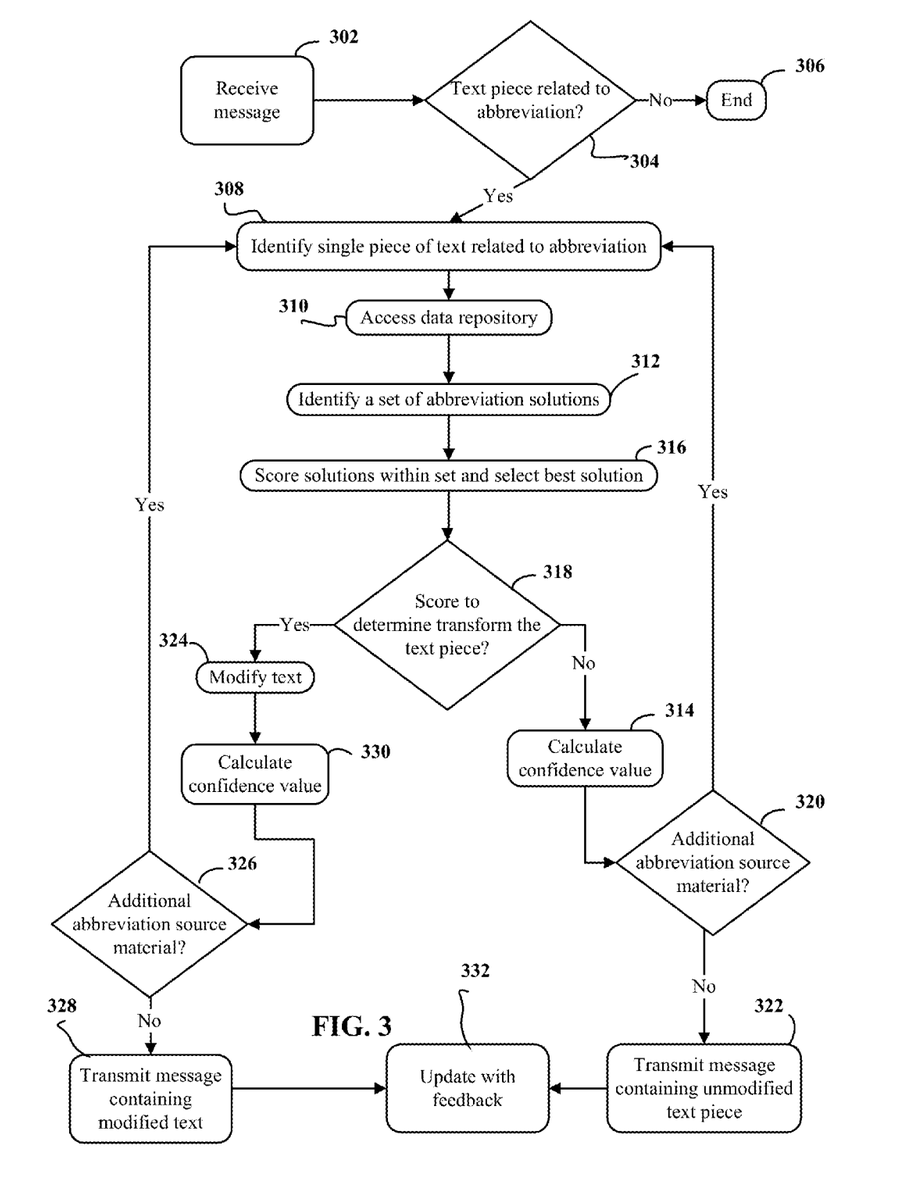
FIG. 3 depicts a flow diagram for determining and transmitting the correct abbreviation solution, according to embodiments of the present disclosure.

FIG. 3 depicts a flow diagram for determining and transmitting the correct abbreviation solution, according to embodiments of the present disclosure. The flow begins when a message containing a text body is received by the system, as shown by block 302. Consistent with embodiments, the message can be sent from an email server, mobile text message application, social media website server, or others. As detailed elsewhere and consistent with embodiments, the message receipt and delivery can occur over a network.

The system can identify and locate a text portion associated with an abbreviation ("text piece") within the text body of the message, per block 304. The system may identify one or more than one instance of an abbreviation-related text piece, and select the first instance of the text piece to proceed through analysis. If no text piece associated with an abbreviation is identified, the system's interaction with the message is complete and the message can be transmitted to the receiver without any modification, as illustrated by block 306.

The system can then access a data repository, per block 310, which as mentioned previously can consist of a static data structure containing, among other things, rules of the system and abbreviation dictionaries. A data repository can also contain profiles of the sender and receiver. As stated elsewhere within this document, the profiles can contain past internet exposure information including past website interactions, past use of abbreviations, and connections within various social media platforms.

Based on the abbreviation and the information accessed in a data repository, an engine can identify a set of potential abbreviation solutions for the text portion, as per block 312. For example, a monitoring engine can access information like the contents of an abbreviation dictionary stored in a static data structure to generate a list of potential expansions for the text piece, which could be an acronym in its collapsed form.

Consistent with embodiments, a processing engine can score the abbreviation solution(s) should be used based on the sender's profile and select the best solution(s) for the text piece associated with an abbreviation, per block 316. In certain embodiments, an engine can use information gathered through data mining and other means to determine the types and styles of communications in which the sender participates. This information is then used to make an inference of the best or most likely context of the sender's message. This information can be used by the processing engine to select the best solution or solutions, in this case one or more potential expansions for the text piece of interest, in this example an acronym. In some embodiments, this selection process can be accomplished through the use of scoring. In determining which solution should be used, a score may be generated based on the information contained within the sender's profile. This generated score can reflect the likelihood that a particular solution is the correct abbreviation the sender intended.

In certain embodiments, an engine is configured to generate a score to reflect the recipient's preferred display option. The score can be generated through determinations based on information contained within the recipient's profile, which includes information on the recipient's inferred internet exposure to the abbreviation. Based on the generated score, the engine can determine whether or not the text piece should be modified to reflect the abbreviation expansion selected, per block 316, as illustrated by decision block 318. For example, if the engine scores a particular solution high, indicating that the receiver has been exposed to the abbreviation on multiple occasions, the solution may not be expanded and instead remain in its condensed form. This case is illustrated by the "no" path from block 318 to block 314.

Figure 4:
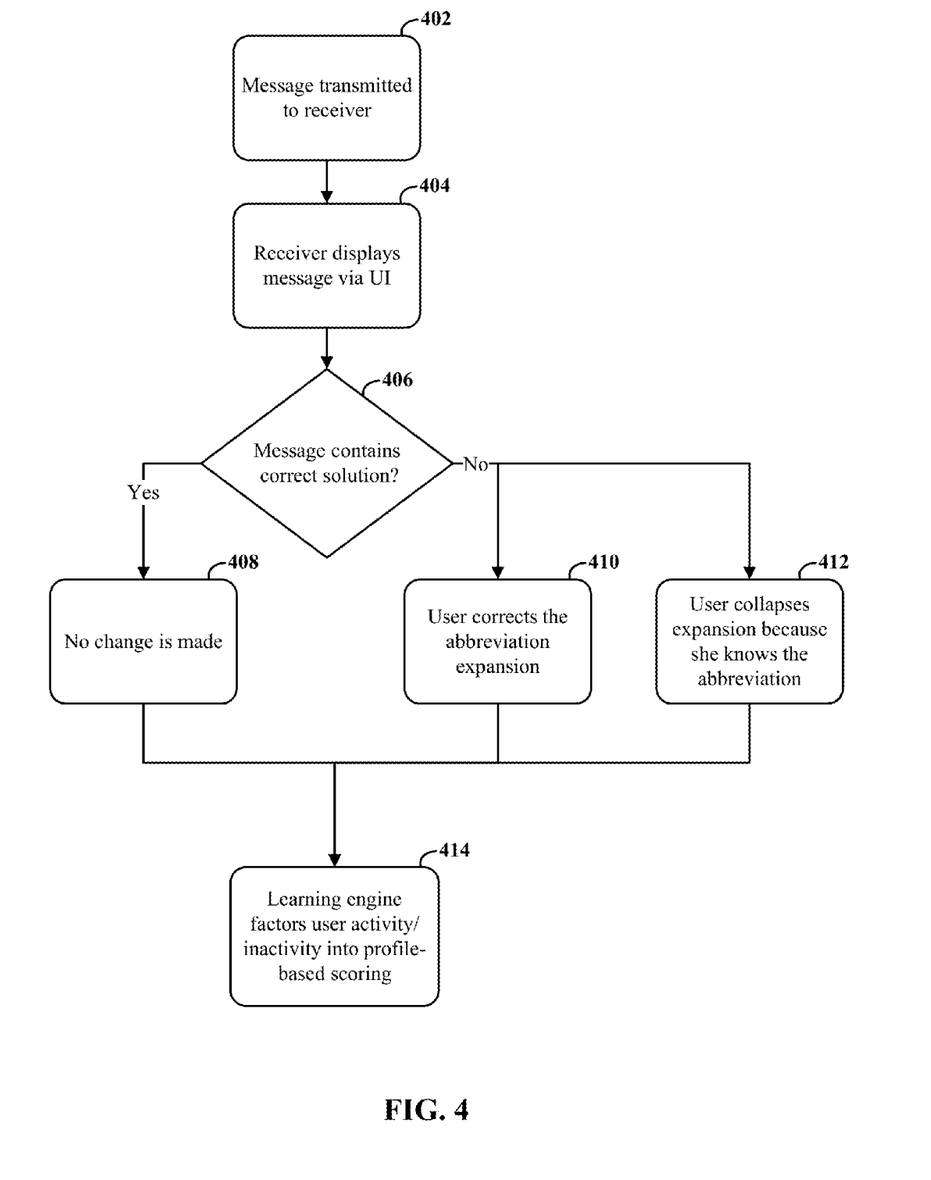
FIG. 4 depicts a flow diagram for generating feedback for profile creation based on specific user interaction with generated and transmitted text body-containing message, consistent with embodiments of the present disclosure.

If a determination not to transform the text piece is made, path 318 to 314, in certain embodiments, an artificial intelligence engine will generate a confidence value, based upon the assigned scores in blocks 316 and 318, among other things. This calculation of a confidence value, block 314, indicates a percent confidence that the given solution (i.e. a particular expansion), in its given form (i.e. collapsed or expanded), is correct. In certain embodiments, this value can attach to the solution, and it will eventually be transmitted with the selected solution to the receiver, per block 322. Before the message is transmitted, however, a monitoring engine may determine if there are any additional text pieces associated with an abbreviation contained within the text body of the message, per decision block 320. In certain embodiments, if a monitoring engine identifies an additional text piece, block 308, the system moves through the determination and scoring process with that text piece. Consistent with embodiments, if no additional text pieces associated with an abbreviation are found, the message is transmitted, with the unmodified text piece, to the recipient. The system updates with user feedback according to, in certain embodiments, a process as illustrated in FIG. 4, as shown by 332.

If at decision block 318, the assigned score(s) indicated a text modification (based on reaching a particular threshold, or another relative determination), the text piece could be changed to reflect the appropriate modification, block 324. For example, the text of an acronym could be replaced with the expanded version of the acronym, i.e. the words comprising the acronym. In certain embodiments a confidence value like the value calculated in 314 would be generated based on scores generated per blocks 316 and 318, among other factors, per block 330. This confidence value may reflect the level of certainty that the generated solution is correct. In certain embodiments, this value can attach to the solution and will eventually be transmitted with the selected solution to the receiver, per block 328.

Before the message is transmitted, however, a monitoring engine may determine if there are any additional text pieces associated with an abbreviation contained within the text body of the message, per decision block 326. In certain embodiments, if a monitoring engine identifies an additional text piece associated with an abbreviation, block 308, the system moves through the determination and scoring process with that text piece. Consistent with embodiments, if no additional text pieces associated with an abbreviation are found, the message is transmitted, with the modified text piece contained within, to the receiver. The system updates with user feedback according to, in certain embodiments, a process as illustrated in FIG. 4, as shown in 332.

The scoring may include any number of different types of data analysis, many of which involve the generation of a structured analysis and the subsequent analysis of new, unrecognized data through the established structure. The scoring may involve processing information from any number of sources, which may or may not be associated with a particular identity. The analysis could involve gaining information from social media connections and various other sources of past internet exposure information. Based on machine learning analytics, the information could be used to generate a function based on each particular source, with each function allowing for differing values to be created as part of the score. Each of these values could also be weighed, according to any number of factors, in order to improve the accuracy of the assigned scores.

The factor could also be weighted based on interactions with the learning engine. For example, a user's direct interaction with the particular abbreviation in a FACEBOOK post (e.g. he posts on a friend's timeline and he uses the abbreviation in its collapsed form) could be weighted more heavily than a passive interaction with the FACEBOOK post (e.g. a friend's post including the abbreviation shows up in his newsfeed).

Another way the factor could be weighted is based on, for example, the effect of the frequency of the user's interactions with a particular source. The length of time between a user's interaction with (or exposure to) a particular source could also be factored into the weighting process. For example, if an engine monitors the user's interactions with an abbreviation in his email, and the user continually modifies the same abbreviation to its expanded form, then the learning engine can—noting that email exposure is less effective in "teaching" the user the abbreviation, perhaps because he rarely reads his emails thoroughly, or perhaps because he has an assistant review his emails—be modified to weight the user's exposure via email less heavily. Similarly, if he hasn't checked his abbreviation-laden email in months, this factor might be weighted less heavily, due to the length of time between his last interaction with the source and his direct interaction with the abbreviation.

FIG. 4 depicts a flow diagram for generating feedback for profile creation based on specific user interaction with generated and transmitted text body-containing message, consistent with embodiments of the present disclosure. FIG. 4 depicts an embodiment of the final block of FIG. 3, 332. Block 402 begins this particular "learning" aspect of the system, when a message is transmitted to the recipient device. The recipient device displays the message to the recipient user, via a user interface, per block 404. Consistent with embodiments, the recipient user may decide, as in decision block 406, whether or not the transmitted and displayed message contains the correct solution. In some embodiments, if the message is correct, no change is made on the user's end, per block 408. The learning engine can then note both the particular recipient's exposure to the text piece solution and the lack of change on the recipient's end. A learning engine can then incorporate this information in to future determinations, for example by adding that information to the receiver's profile, per block 414.

If at block 406 the recipient user determines the message does not contain a correct solution, she can modify the text piece associated with an abbreviation. The user may correct the abbreviation expansion, per block 410. For example, if a recipient user realizes that, in the context of the message, "LOL" actually stands for "lands of lore" and not, "laugh out loud," as displayed in the text, she could select the correct expansion from a list of solutions and change it on the screen, per block 410. A learning engine could factor this user modification into later determinations, for example by including the information in both the sender and receiver's profile, per block 414.

If at decision block 406 the recipient user determines the message does not contain a correct solution she can modify the text piece. The user may correct the solution (e.g. an abbreviation expansion) by collapsing the expansion because she already knows the abbreviation, per block 412. For example, if the modified text piece displays "laugh out loud" in the text body, and the reader is already familiar with the abbreviation, she can elect to collapse it back to its abbreviated form. A learning engine can monitor this change and factor it into future determinations, per block 414.

In certain embodiments, the scoring-based modifications can be overridden by user-controlled settings. For example, these settings can allow a user to increase or decrease the frequency of abbreviation modifications, the extremes of which would be for the recipient user to only receive abbreviations in a collapsed form or only receive abbreviations in an expanded form. A setting could also allow a user to alter the frequency at which a particular abbreviation or abbreviations were expanded or collapsed.

In certain embodiments a setting could include one which selects for an expanded version of a particular abbreviation in the first instance of a particular message, while collapsing all over instances of the same abbreviation within the message. If all instances of the abbreviation in the message were already in their collapsed form, the setting could expand the first instance of the abbreviation, while leaving all other instances of the abbreviation in their collapsed form.

For example, a recipient user who uses social media and his smartphone to text very often, may be very familiar with abbreviations used in a social setting. Since most of his use is social, he could modify a setting which would collapse all abbreviations identified by the system. This setting would thus override any collapse or expand scoring-based change that normally would have occurred. The user's ability to expand an unfamiliar abbreviation would not be compromised due to a setting modification.

For example, a recipient user might use the internet and email almost exclusively for business reasons. This user might also not be connected via any form of social media. In this case, the user could modify his settings to raise a threshold for expansion on business-related abbreviations and drop an expansion threshold for abbreviations used primarily in a social context. Here, the word threshold is used to signify some sort of cut off or the system's sensitivity to a score relative to the score-based modifications. In this example, the user's modification to raise the expansion threshold would decrease the sensitivity and decrease the number of abbreviations that were transmitted to him in an expanded form. Conversely, his modification of a setting to drop the expansion threshold for abbreviations in a social context could result in an increased sensitivity and more of those types of abbreviations being transmitted in their expanded form.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
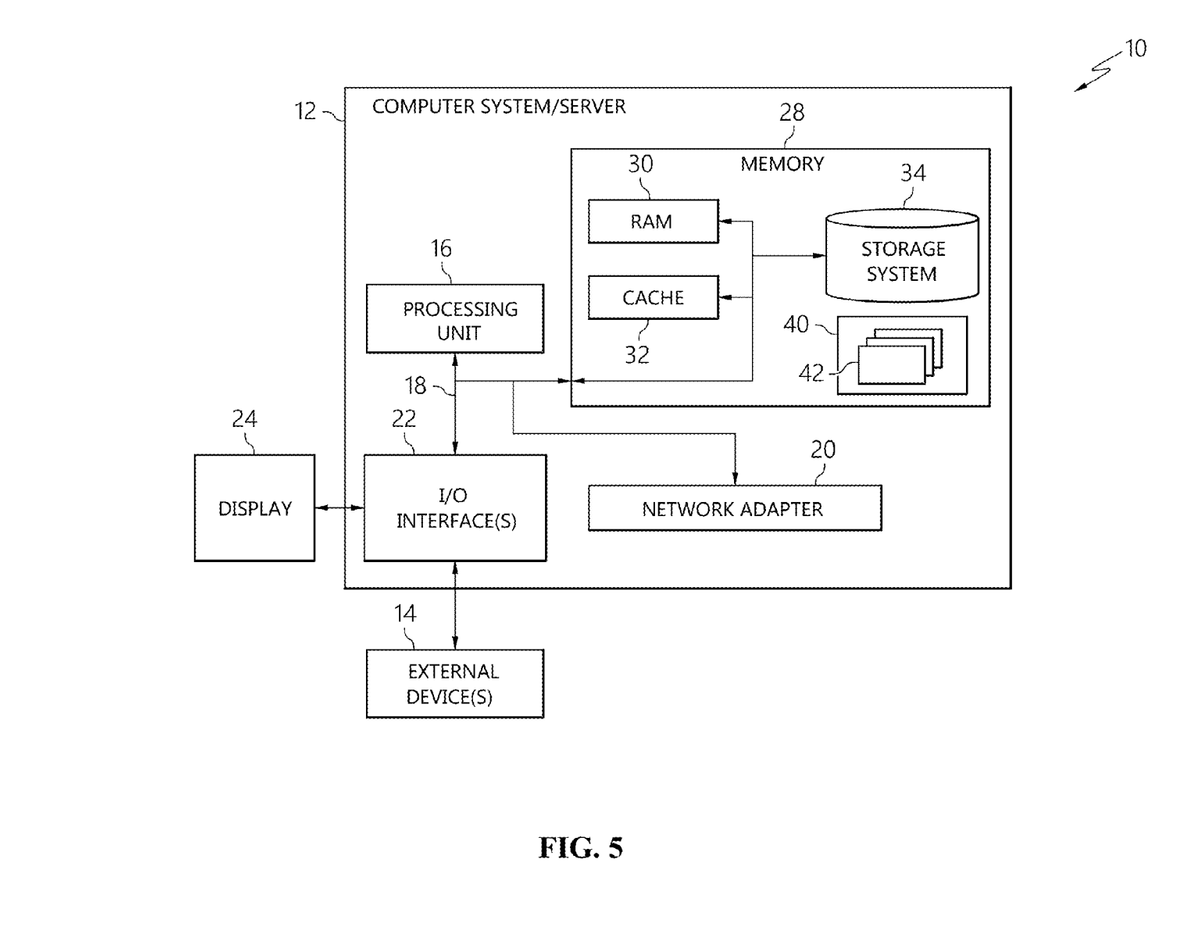
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
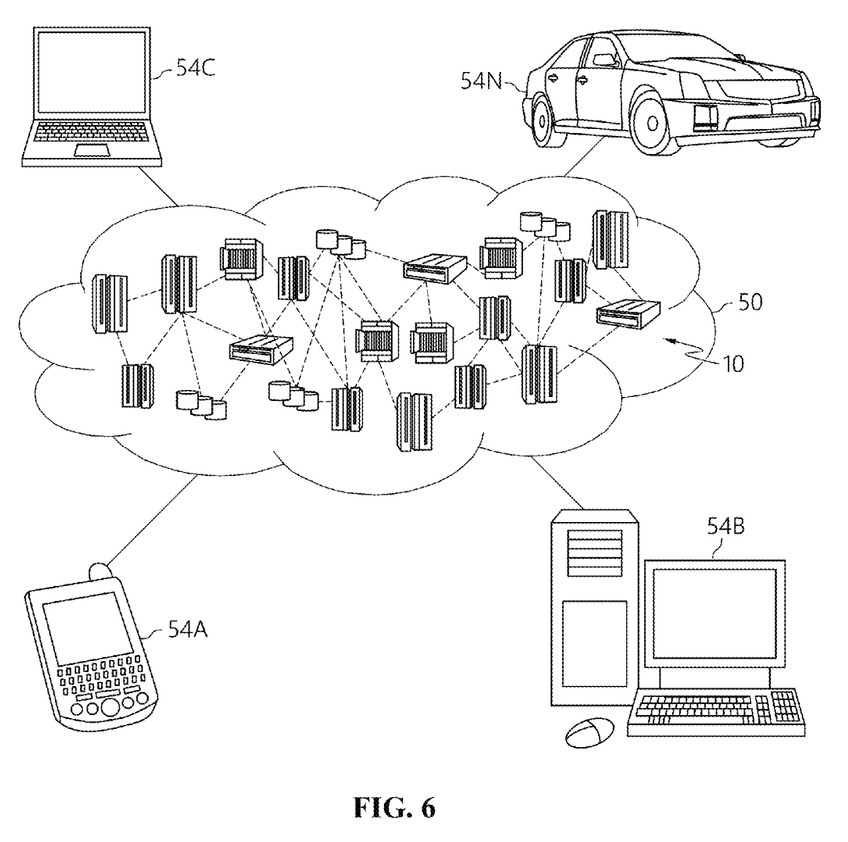
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
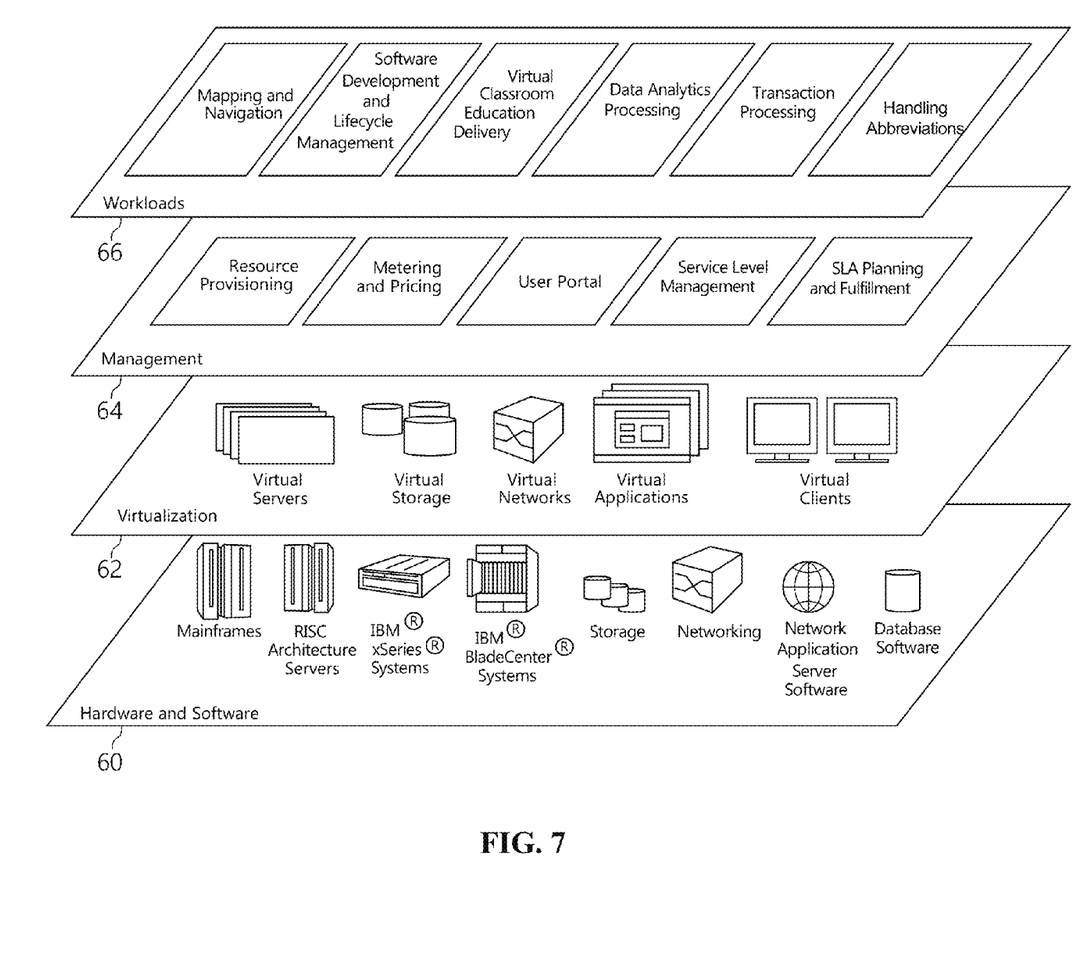
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an engine for handling abbreviations based on machine learning.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for providing solutions relating to abbreviations, the method comprising:
receiving, by a computer system, a message that specifies a recipient and sender and that includes a text body;
identifying, by the computer system and from within the text body, a first text portion associated with an abbreviation;
retrieving, by the computer system, a profile of the sender and a profile of the recipient, wherein the profile of the sender contains online content exposure information that is generated from a history of the sender's online activities, and the profile of the recipient contains online content exposure information that is generated from a history of the recipients online activities;
identifying, by the computer system and based on the profile of the sender, one or more solutions for the first text portion associated with the abbreviation;
scoring, by the computer system, each of the one or more solutions using the profiles of the sender and recipient, wherein the scoring includes a first score which reflects the likelihood that the each of the one or more solutions is the abbreviation the sender intended based upon online content exposure information in the profile of the sender, and a second score which reflects the recipient's familiarity with and knowledge of the each of the one or more solutions based upon online content exposure information in the profile of the recipient;
identifying, by the computer system and based upon the scoring, a particular solution of the one or more solutions for use, wherein the identifying based upon the scoring by combining the first score and the second score to calculate an overall confidence value that reflects the accuracy of the particular solution;
modifying the text body of the message to include the particular solution, wherein the modifying the text body comprises expanding a first instance of the abbreviation and leaving other instances of the abbreviation collapsed, based on the profile of the recipient; and
transmitting the message and the confidence value, as modified, to the recipient.

2. The method of claim 1, further comprising:
determining an inferred context of the message using information from the sender's profile; and
determining a probable knowledge of the one or more solutions using information from the recipient's profile.

3. The method in claim 1, further comprising overriding a modification to another abbreviation based on settings in the recipient's profile.

4. The method of claim 1, further comprising:
mining, relative to abbreviations, a database for internet use history for a particular user;
determining exposure to a particular abbreviation for the particular user; and
storing, in a profile for the particular user, the exposure to the particular abbreviation.

5. The method of claim 1, wherein scoring each of the one or more solutions includes assigning scores based upon an amount of time between the recipient's interaction with an abbreviation-related text portion and a profile access.

6. A computer system comprising: at least one processor circuit that includes:
a monitoring engine configured to:
receive a message that specifies a recipient and a sender and that includes a text body;
identify, from within a text body, a first text portion associated with an abbreviation; and
a processing engine configured to:
retrieve a profile of the sender and a profile of the recipient, wherein the profile of the sender contains online content exposure information that is generated from a history of the sender's online activities, and the profile of the recipient contains online content exposure information that is generated from a history of the recipients online activities;
identify, based on the profile of the sender, one or more solutions for the first text portion associated with the abbreviation;
score each of the one or more solutions using the profiles of the sender and recipient, wherein the scoring includes a first score which reflects the likelihood that the each of the one or more solutions is the abbreviation the sender intended based upon online content exposure information in the profile of the sender, and a second score which reflects the recipient's familiarity with and knowledge of the each of the one or more solutions based upon online content exposure information in the profile of the recipient;
identify, based on the scoring, a particular solution of the one or more solutions for use, wherein the identifying based on the scoring by combining the first score and the second score to calculate an overall confidence value that reflects the accuracy of the particular solution;
modify the text body of the message to include the particular solution, wherein modifying the text body comprises expanding a first instance of the abbreviation and leaving other instances of the abbreviation collapsed, based on the profile of the recipient; and
transmit the message and the confidence value, as modified, to the recipient.

7. The system in claim 6, wherein the processing engine is further configured to:
determine an inferred context of the message using information from the sender's profile; and
determine a probable knowledge of the one or more solutions using information from the recipient's profile.

8. The system in claim 6, wherein the processing engine is further configured to override a modification of another abbreviation based on settings in the recipient's profile.

9. The system in claim 6, wherein the processing engine is further configured to:
mine, relative to abbreviations, a database for internet use history for a particular user;
determine exposure to a particular abbreviation for the particular user; and
store, in a profile for the particular user, the exposure to the particular abbreviation.

10. The system in claim 6, wherein the processing engine is further configured to score each of the one or more solutions based upon an amount of time between the recipient's interaction with an abbreviation-related text and a profile access.

11. A computer program product for handling abbreviations, the computer program product comprising a non-transitory computer readable storage medium having program instructions embodied therewith, the program instruction executable by a computer processing circuit to cause the circuit to perform a method comprising:
- receiving a message that specifies a recipient and sender and that includes a text body;
- identifying, from within the text body, a first text portion associated with an abbreviation;
- retrieving a profile of the sender and a profile of the recipient, wherein the profile of the sender contains online content exposure information that is generated from a history of the sender's online activities, and the profile of the recipient contains online content exposure information that is generated from a history of the recipients online activities;
- identifying, based on the profile of the sender, one or more solutions for the first text portion associated with the abbreviation;
- scoring, by the computer system, each of the one or more solutions using the profiles of the sender and recipient, wherein the scoring includes a first score which reflects the likelihood that the each of the one or more solutions is the abbreviation the sender intended based upon online content exposure information in the profile of the sender, and a second score which reflects the recipients familiarity with and knowledge of the each of the one or more solutions based upon online content exposure information in the profile of the recipient;
- identifying, based upon the scoring, a particular solution of the one or more solutions for use, wherein the identifying based upon the scoring includes by combining the first score and the second score to calculate an overall confidence value that reflects the accuracy of the particular solution;
- modifying the text body of the message to include the particular solution, wherein the modifying the text body comprises expanding a first instance of the abbreviation and leaving other instances of the abbreviation collapsed, based on the recipient profile; and
- transmitting the message and the confidence value, as modified, to the recipient.

12. The computer program product of claim 11, wherein the program instructions are further executable by the computer processing circuit to cause the circuit to:
- determine an inferred context of the message using information from the sender's profile and,
- determine a probable knowledge of the one or more solutions using information from the recipient's profile.

13. The computer program product of claim 11, wherein the program instructions are further executable by the computer processing circuit to cause the circuit to override a modification to another abbreviation based on settings in the recipient's profile.

14. The computer program product of claim 11, wherein the program instructions are further executable by the computer processing circuit to cause the circuit to:
- mine, relative to abbreviations, a database for internet use history for the particular user;
- determine exposure to a particular abbreviation for the particular user; and
- update the particular profile based upon the determined exposure.

15. The computer program product of claim 11, wherein scoring each of the set of one or more solutions includes assigning scores based upon an amount of time between the recipient's interaction with an abbreviation-related text and a profile access.

* * * * *